United States Patent [19]

Bamji et al.

[11] Patent Number: 4,870,121
[45] Date of Patent: Sep. 26, 1989

[54] ELECTRICAL TREE SUPPRESSION IN HIGH-VOLTAGE POLYMERIC INSULATION

[75] Inventors: Soli S. Bamji, Gloucester; Aleksander T. Bulinski, Orleans; John Densley, Cumberland, all of Canada

[73] Assignee: Canadian Patents & Development Ltd., Ottawa, Canada

[21] Appl. No.: 112,079

[22] Filed: Oct. 26, 1987

[51] Int. Cl.$^4$ .............................................. C08K 5/34
[52] U.S. Cl. .................................... 524/91; 524/236; 524/283; 428/418; 428/461; 428/523; 522/75; 522/78; 522/79; 525/450
[58] Field of Search .................. 524/91, 236, 283; 428/418, 461, 523; 525/450; 522/75, 78, 79

[56] References Cited

U.S. PATENT DOCUMENTS

| | | | |
|---|---|---|---|
| 3,018,269 | 1/1962 | Bruno | 524/91 |
| 3,223,664 | 12/1965 | Conlon | 524/236 |
| 3,499,791 | 3/1970 | Maloney | 117/232 |
| 3,795,646 | 3/1974 | MacKenzie, Jr. | 260/291 |
| 3,956,420 | 5/1976 | Kato et al. | 260/827 |
| 4,206,260 | 6/1980 | McMahon | 428/379 |
| 4,208,465 | 6/1980 | Chang | 428/418 |
| 4,288,492 | 9/1981 | Hiromae et al. | 428/418 |
| 4,307,147 | 12/1981 | Ohishi et al. | 428/418 |
| 4,403,053 | 9/1983 | Lewis | 524/91 |
| 4,529,538 | 7/1985 | Kim | 524/236 |
| 4,563,259 | 1/1986 | Rayner | 522/75 |
| 4,601,972 | 7/1986 | Small, Jr. | 522/75 |
| 4,710,524 | 12/1987 | Donohue | 522/75 |
| 4,749,734 | 6/1988 | Williams et al. | 522/75 |
| 4,797,438 | 1/1989 | Kletecka et al. | 522/75 |

OTHER PUBLICATIONS

Shimizu, N. et al., The Space Charge Behavior and Luminescence Phenomena in Polymers at 77K, IEEE Trans. Electr. Insul. EI-14 256 (1979).
Bamji, S. et al., Light Emission from Polyethylene Subjected to Highly Divergent Fields, Annual Report of 1982 CEIDP, IEEE Service Center, Piscataway, N.J., p. 592.

Primary Examiner—John Kight
Assistant Examiner—Kriellion Morgan
Attorney, Agent, or Firm—Juliusz Szereszewski

[57] ABSTRACT

Polymeric dielectrics which are exposed to highly divergent electric fields break down more quickly than expected because of the generation of ultra-violet radiation at defect points which degrades the polymer locally and leads to the formation of electrical trees in a polymeric insulation. The use of ultra-violet stabilizers, preferably in combination with reduced concentration of oxygen in the polymer, significantly extends the time to initiation of electrical treeing by preventing photodegradation of the polymer.

10 Claims, 5 Drawing Sheets

ELECTRICAL TREE SUPPRESSION IN HIGH-VOLTAGE POLYMERIC INSULATION

BACKGROUND OF THE INVENTION

Electrical-treeing phenomena which occur in polymers such as low-density polyethylene (LDPE) and crosslinked polyethylene (XLPE) have been under study for many years. Several mechanisms have been proposed to explain electrical treeing in insulation materials subjected to high electric fields. Among these are: (a) fatigue cracking due to Maxwell stress, (b) Joule heating that leads to thermal decomposition, (c) high field-induced impact ionization and (d) hot electrons that can break polymer bonds. However, none of these can explain adequately the gradual degradation that leads to electrical-tree initiation in cables subjected to stresses much lower than the breakdown strength of the polymeric insulation. Mechanism (a) cannot be responsible for tree initiation because mechanical stresses produced in polyethylene (PE) cables operating at working stresses are only a fraction of the tensile strength of the polymer. Mechanism (b) requires the preexistence of a cavity within which partial discharges (PD) can occur, but tests with needles in solids have shown that no initial void at the needle tip is required to start tree growth. Mechanisms (c) and (d) require that the charge carriers in the polymer gain large energies from the electric field. But since the mean free path of charges in PE is of the order of a few molecular radii (5–20 Å), it is almost impossible for them to become hot enough to cause impact ionization or break bonds of the polymer chain. However, in high-voltage cables, gradual degradation that leads to electrical-tree initiation probably occurs at electrical fields much lower than the breakdown strength of the polymeric insulation. Thus, besides the fact that a stress concentration is always required, the initiation mechanism of electrical trees is not fully understood. Defects that are accidentally introduced into the polymer during cable manufacture become points of high local stress and reduce insulation performance. Such points of high electrical stress are usually simulated in the laboratory by molding needles into the polymer.

To overcome the problem of electrical treeing, several solutions have been proposed thus far. For instance, McMahon U.S. Pat. No. 4,206,260 proposes using LDPE or XLPE insulation with an amount of an alcohol of 6 to 24 carbon atoms. Maloney U.S. Pat. No. 3,499,791 discloses a polyethylene insulation containing an inorganic ionic salt of a strong acid and a strong Zwitter-ion compound. Kato et al, U.S. Pat. No. 3,956,420 discloses insulation comprising a polyolefin, a ferrocene compound and a substitute quinoline compound. Additionally, a small amount of polyhydric alcohol, dispersant, surfactant or unsaturated polymer or mixture thereof is used. MacKenzie, Jr. U.S. Pat. No. 3,795,646 recommends the use of a silicone fluid in a crosslinked polyethylene composition.

Shimizu et al (IEEE Trans. Electr. Insul. El-14, 256 (1979) have reported that light is emitted at needle tips in LDPE subjected to highly divergent fields at a cryogenic temperature (liquid nitrogen). Bamji et al. (Annual Report of 1982 Conference on Electrical Insulation and Dielectric Phenomena. IEEE Service Center, Piscataway, N.J., p. 592) have discovered similar emissions at room temperatures. This light has been attributed to electroluminescence (EL) caused by charge injection into the polymer from the metallic point.

SUMMARY OF THE INVENTION

Ultraviolet (UV) radiation has been detected by the present inventors during tree initiation, the radiation occurring at needle tips embedded in low density polyethylene (LPDE). It is proposed that the UV radiation causes photodegradation of the polymer, i.e. the energy is dissipated as photons which break the polymer and eventually create a microcavity in which partial discharges can occur and lead to tree propagation.

It is important to note that the UV radiation detected in the conditions described herein has a range of 4000 Å to 2000 Å (400=200 nm) while sunlight has a cutoff of 2900 Å.

This invention is directed to an article, or apparatus, used in high-voltage applications, the apparatus including a polymeric dielectric material not normally exposed to sunlight. The dielectric material comprises an ultraviolet light stabilizer present in sufficient quantity as to retard the degradation of the polymeric dielectric resulting from the ultra-violet radiation produced by the electric field carried in the apparatus and thereby extending the time to initiation of electrical treeing in the dielectric material. The resistance to treeing is promoted and enhanced by reducing the concentration of oxygen in the material.

The apparatus can be one selected from the group consisting of underground cables, undersea cables, H.V. switches, transformers, capacitors and other equipment, the insulation of which is not normally exposed to sunlight.

The polymeric dielectric material included in the apparatus is preferably one selected from the group comprising: polyolefins such as low density polyethylene, or ethylene-propylene-diene terpolymer (EPDM), ethylene propylene rubber and epoxy resins but need not be limited to this group.

The ultraviolet light stabilizer is chosen from the group comprising: benzotriazoles, hindered amine light stabilizers, nickel chelates and substituted benzophenones, but need not be limited to this group.

The maximum amount of ultraviolet light stabilizer present in the polymeric dielectric is the equilibrium concentration which is the point where no more ultraviolet light stabilizer can be added to the dielectric material without causing precipitation. The minimum amount is about 0.5% by weight or less, depending on the other components of the apparatus and its operating conditions.

DETAILED DESCRIPTION OF THE INVENTION

Figure 1A:
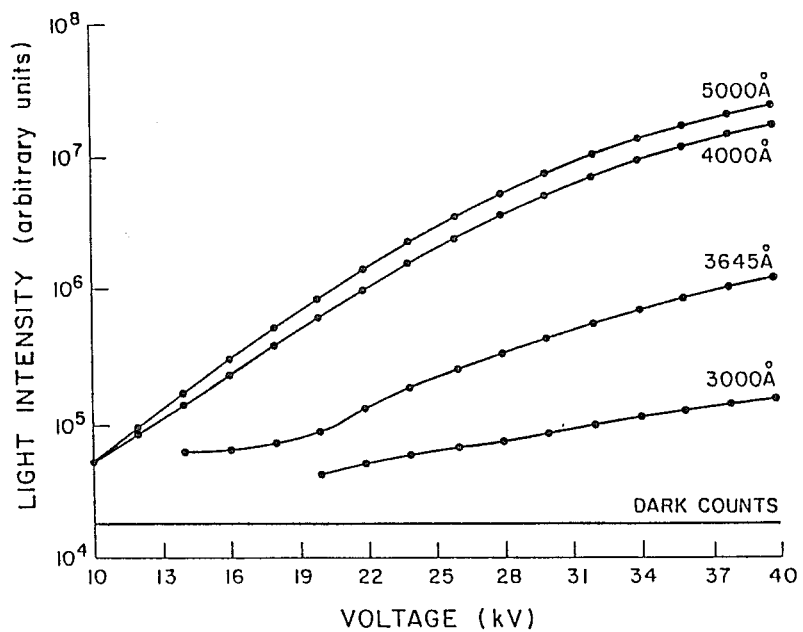

While the findings leading to the invention have been made when investigating only a narrow group of translucent dielectric polymeric materials such as low density polyethylene and cross-linked polyethylene, the translucence being the advantageous factor in determining the spectra of light emitted at defect points in the material, it is reasonable to assume that the same mechanism of degradation as discovered takes place in a number of other dielectric polymeric materials, both translucent and opaque.

The following is a description of the experimental procedure used to determine the effect of a UV stabilizer on the resistance to treeing of polyethylene insulations.

The polymer resins used in these experiments were:
Type A: LDPE containing 70 ppm antioxidant (Irganox 1010)
Type B: LDPE containing 800 ppm of the same antioxidant
Type C: HV-cable grade LDPE (Union Carbide HFDA 6201).

Type C specimens containing about 0.5% of a UV stabilizer [2-(2'-hydroxy-3',5'-ditert-amylphenyl] benzotriazole were also used.

The resins were injection molded into block specimens around needles having 1 and 3 μm tip radii at ca. 140° C. The block was 9 mm wide, 2.5 mm deep and 19 mm high. The needle was embedded in the block lengthwise and in line, equidistant from the faces of the blocks. The cone-shaped tip was spaced 11 mm from the needle entry surface of the block and thus 8 mm from the opposite, bottom surface which was coated with carbon to ensure good contact with the other electrode.

Some specimens were degassed for more than 100 h in a vacuum oven at 50° C. and 0.1 Pa prior to testing inside a light-tight chamber.

In the experiments, 60 Hz AC voltage was applied to the specimens in steps of 2 kV with either 1 or 2 min at each step. Light and PD pulses were recorded simultaneously. High precision narrow-band (±50 Å) interference filters having centre wavelengths at 5000, 4000, 3645 and 3000 Å were used to resolve the spectra of light emitted at the needle tip. The light was focussed by an optical lens system onto the photocathode of a photomultiplier tube (PMT) (RCA C-31034A) having a spectral range of 2000-9000 Å and a cathode responsivity of 1025 μA/1m. The tube was operated at −40° C. so as to minimize the dark-pulse counts. To take into account the chromatic aberration of the optical system at different wavelengths, the PMT was mounted on a movable stage.

PD were monitored simultaneously using a detection system having a sensitivity of $4 \times 10^{-14}$ C. The PD (when detected) and light pulses were counted simultaneously by a multichannel analyzer operating in the pulse height analysis mode. The phase relationship between the ac cycle and the light pulses was obtained using a dual-beam oscilloscope.

Figure 1B:
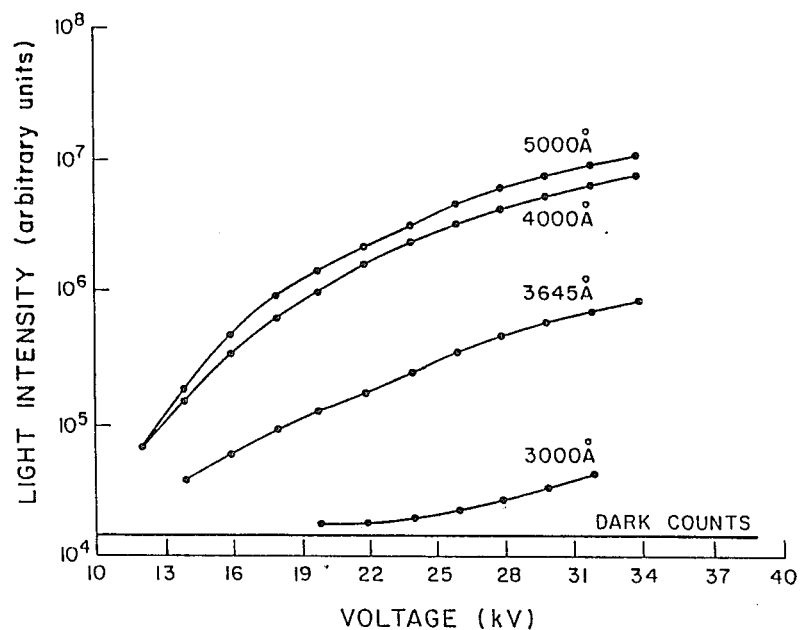
Figure 1C:
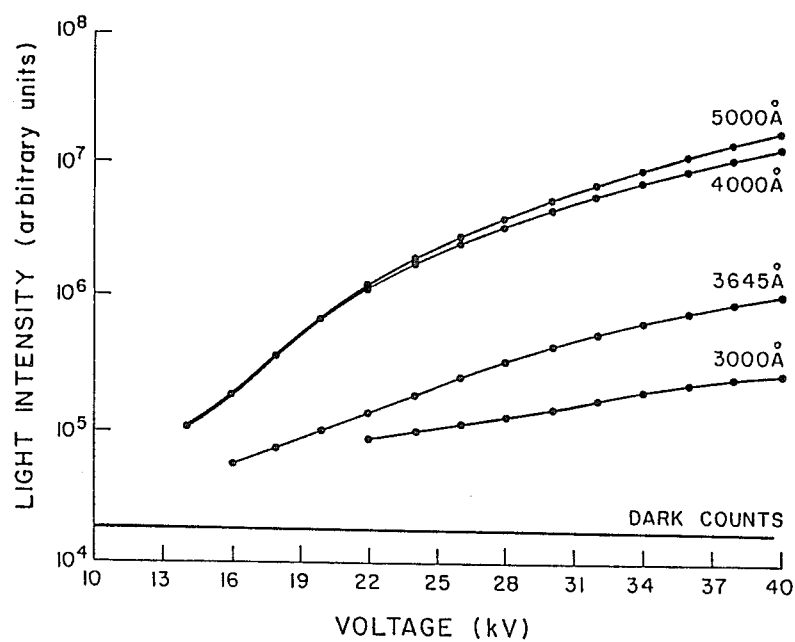
Figure 2A:
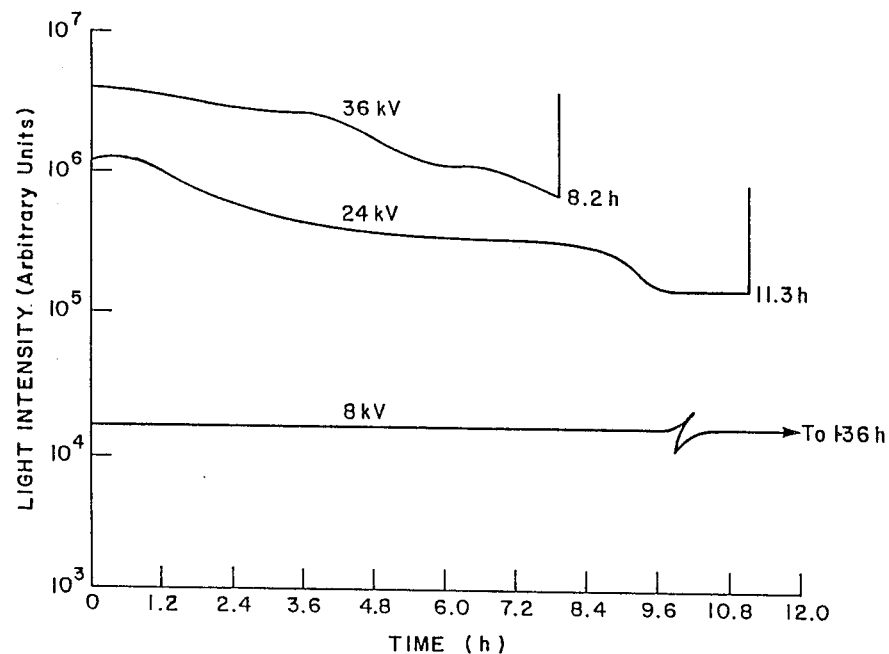
Figure 2B:
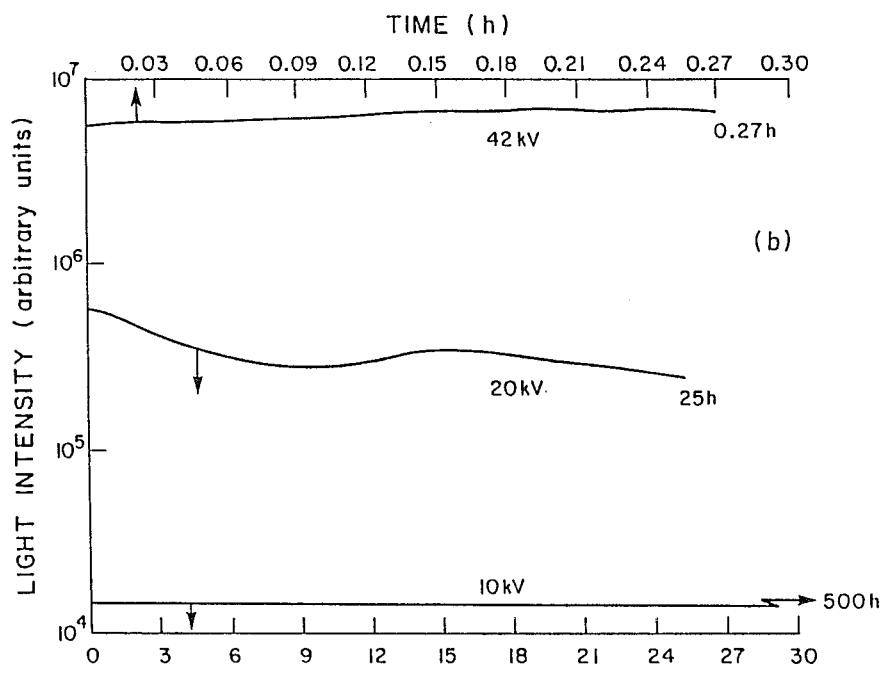
Figure 3:
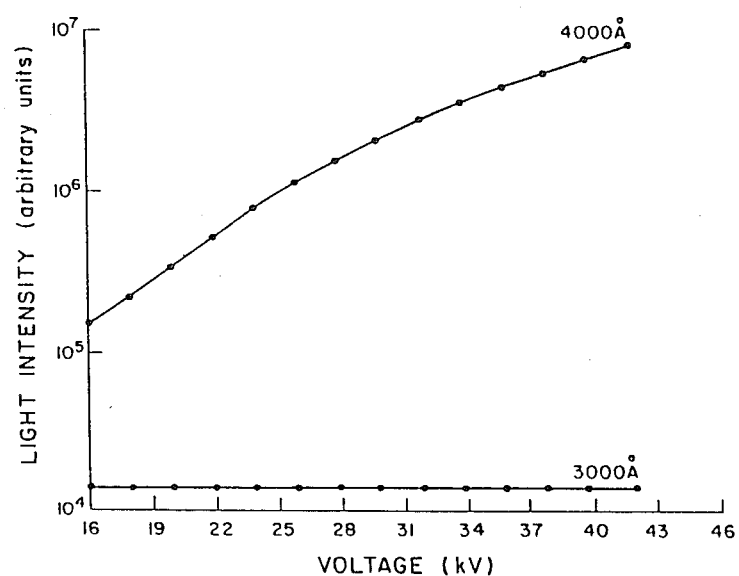
Figure 4:
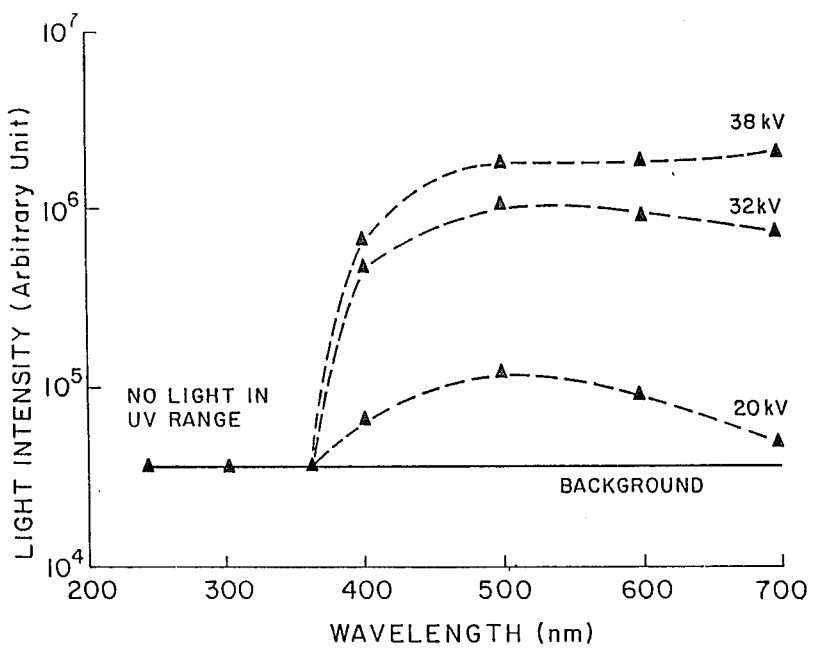
Figure 5:
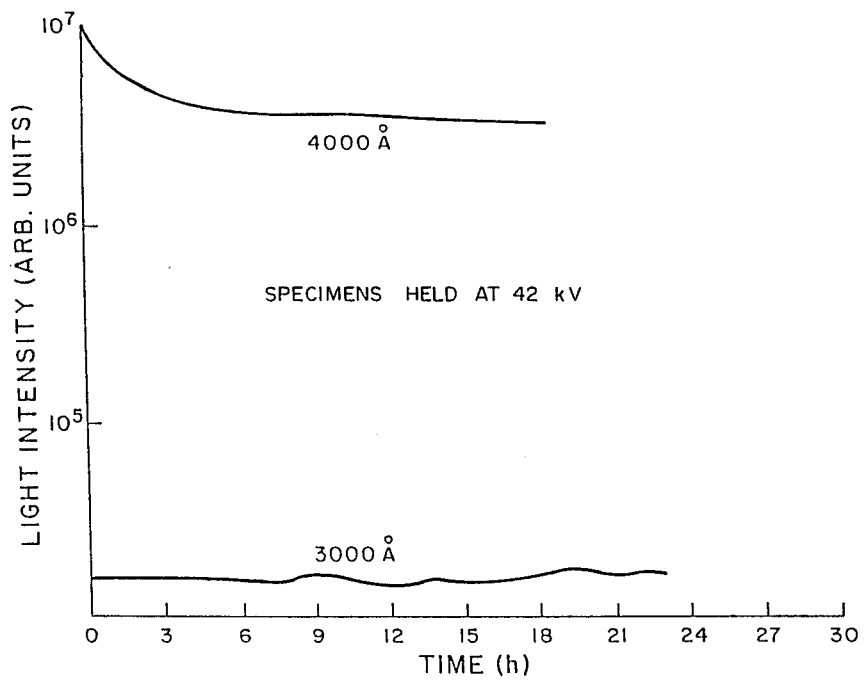
Figure 6:
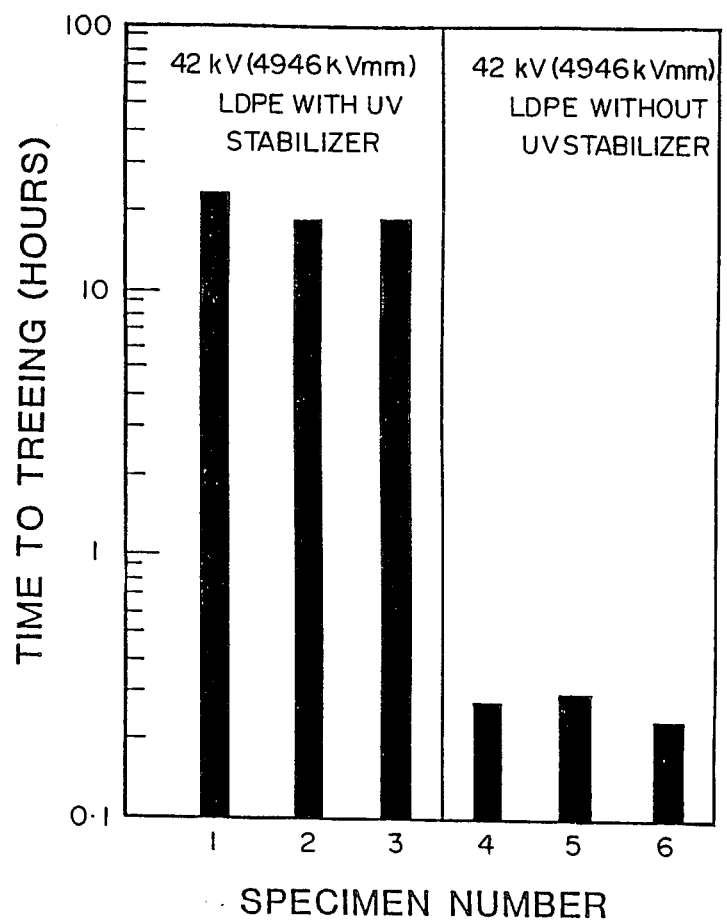

In the drawings which illustrate the results of the experiments,

FIG. 1(a) is a plot of light intensity at different wavelengths versus applied voltage for specimens of type A with tip radius 1.2 μm, FIG. 1(b) is a similar plot for specimens of type B with tip radius 1.3 μm, FIG. 1(c) is a similar plot for specimens of type C with tip radius 1.3 μm, FIGS. 2(a) and 2(b) illustrate light intensity vs the time of voltage application for (a) type A specimens having 3 μm needles, at wavelength of light 3645 Å and (b) type C specimens having 1 μm needles, wavelength of light 4000 Å, FIG. 3 shows the light intensity at two wavelengths versus applied voltage for type C specimens containing about 0.5% of a UV stabilizer, FIG. 4 shows the spectra of light emitted from a type C specimen containing 1% of nickel chelate, FIG. 5 is a plot of light intensity vs the time of voltage application for HV cable grade PE containing UV stabilizer, and FIG. 6 illustrates a comparison between type C specimens with and without UV stabilizer.

As seen in FIGS. 1(a) to 1(c), the intensity of the light emitted at different wavelengths for all three types of specimens increased with the voltage applied, and good reproducibility was obtained for specimens of the same type, molded under similar conditions, provided they did not contain any microvoids or damaged needle tips. At all voltage levels, light in the visible range was more intense than UV light.

FIGS. 2(a) and (b) show that for both types of LDPE, specimens held at higher voltages emitted more intense light and had shorter times to tree initiation. The onset of an electrical tree was indicated by emission of very intense PD light. Specimens held at voltages above the light-inception level always developed a tree, but those held below the light-inception level did not develop a tree even after long periods of voltage application.

FIG. 3 shows the light intensity for type C specimens containing 0.5% of a UV stabilizer, [2-(2'-hydroxy - 3', 5'-ditert-amylphenyl) benzotriazole]. While the light at 4000 Å was similar to that emitted by ordinary type C specimens (compare FIG. 1(c)), no UV light at 3645 or 3000 Å was detected.

FIG. 4 illustrates, by way of example, the spectra of light emitted from a type C specimen containing 1% of nickel chelate. Similar spectra, not illustrated in the drawing, were observed when other photostabilizers, as listed below, were added to the polymer. No light emission below 4000 Å was detected from such specimens. Polymer samples containing the stabilizers initiated electrical trees after much longer periods, when held at the same voltage levels, as samples without the stabilizer.

The chemical type, trade names and chemical names of the photostabilizers used (beside the benzotriazole, see FIG. 3) are listed in Table 1. The polymer was Type C LPDE.

TABLE 1

| Chemical Type | Trade Name | Chemical Name |
|---|---|---|
| Substituted benzophenone | Chimasorb 81 | 2-hydroxy-4-n-octyloxy-benzophenone |
| Nickel chelate | Cyasorb 1084 | 2.2'-thiobis(4-tert-octylphenolato)-butylamino-nickel (II) |
| Hindered amine light stabilizer | Tinuvin 622 | Dimethyl-succinate polymer with 4-hydroxy-2,2,6,6-tetramethyl-1-piperidine-ethanol |

Other photostabilizers suitable for the purpose of this invention are, for instance:

| Benzotriazole | [2-(2'-hydroxy-3', 5'-ditert-butyl-phenyl) benzotriazole] |
| Hindered Amine Light Stabilizer | Dimethyl-succinate polymer with 4-hydroxy-2,2,6,6-tetraethyl-1-piperidineethanol |
| Substituted benzophenone | 2-hydroxy-4-n-decyloxybenzophenone or 2-hydroxy-4-n-alkyloxy-benzophenone where the alkyl has 8 to 14 carbon atoms |
| Nickel chelate | 2,2'-thiobis (4-tert-butylphenolato)-butylamino-nickel (II) |

FIG. 5 shows the long-term behaviour of type C specimens containing the UV stabilizer, held at 42 kV. No UV light was detected until tree inception.

FIG. 6 shows, in a bar graph manner, the difference in resistance to electrical treeing for type C LDPE. Only specimens 1-3 contained a UV stabilizer. Specimens were tested at 42 kV which corresponds to electric stress, at the needle tips of 4946 kV/mm.

It can be seen from FIGS. 2(a) and (b) that once light is emitted, a tree follows invariably and the time to treeing depends on the voltage level at which the specimen is held. For voltages below the light inception level, no trees were detected even after long time periods. This suggests that a critical voltage is required for light emission and subsequent tree initiation, and the light-inception voltage is probably the threshold voltage at which the insulation starts to deteriorate. HV cables operating at voltages below the light-inception level should not deteriorate. However, impurities that are accidentally introduced into the polymer or at an interface during cable manufacture could increase the local electric stress above light-inception levels especially during switching and lightning surges.

The photodegradation of polymers by UV radiation is well documented. UV stabilizers are a common component of an electric polymeric insulation normally exposed to sunlight. This has not, however, been the case with non-exposed apparatus thus far.

The role of impurities in the polymer must be emphasized. Despite many efforts, it has been practically impossible to eliminate the intrusion of small foreign matter in the polymeric dielectric insulation such as PE. These experiments confirm that the UV light emitted at the needle tip or defect points contributes to the formation of a micro-void which in turn can incur partial discharges that cause tree propagation.

Comparison of FIGS. 2(b) and 5 shows that adding UV stabilizer to type C specimens held at 42 kV increases the tree initiation time by almost two orders of magnitude. Similar conclusion can be drawn from FIG. 6.

The voltage at which charge injection from the needle tip into the polymer occurs depends on the electrical double layer formed during molding at the needle-polymer interface. Once a charge is injected into the polymer it can get trapped only after a few scatterings because of the small free path of the charge carriers and the large localized gap-state concentration.

The trapped charge forms a space charge which tends to reduce the field at the injecting electrode so as to decrease the rate of charge injection. Thus, the actual local field at the tip is decreased by the space charge. Also the space charge increases with the applied voltage.

In addition to being trapped, the injected charge can excite the molecules of the gas, impurities, or luminescent centers present in the polymer. Light can be emitted when the excited species return to the ground states or the recombination of electrons and holes occurs at the recombination centers. Degassing the specimens in rough vacuum decreases the concentration of gas molecules by about six orders of magnitude, and the probability of interaction between injected charge and gas molecules is significantly reduced. For gas-impregnated specimens, the gases are localized solely in the amorphous regions of the material and could be excited by the injected charge. The electronic de-excitation of the gas molecules should yield emission spectra characteristic of the gas and are mostly in the UV range for $N_2$, $O_2$, and $SF_6$. As a result of their high electron affinity, $O_2$ and $SF_6$ will capture some of the electrons. As a triplet, ground-state molecular $O_2$ can interact with other triplets leading to singlets without undergoing spin-forbidden processes, and thus may quench or shorten the lifetime of many excited states. This would give a smaller number of light pulses for specimens impregnated with electronegative gases than degassed specimens. The quenching reaction can result in the production of the energy-enriched long-lived form of molecular oxygen which can act as a powerful oxidizing agent.

Low tree-inception voltage in the presence of energy-enriched $O_2$ is due to rapid degradation of PE caused by its strong reactivity with the polymer. Inert gases (such as $N_2$), even when excited, will likely produce less degradation of the polymer, and hence $N_2$-impregnated specimens withstand much higher stresses.

In the experiments, rough vacuum of ca. 0.1 Pa or $10^{-3}$ Torr was used to reduce the oxygen concentration in the polymer specimens. Pure nitrogen was found to be the preferable inert gas to substitute for oxygen in the samples. However, it is reasonable to expect that lowering the oxygen concentration in general, in addition to the presence of UV stabilizers in the polymeric insulation, brings about the advantages as illustrated hereinabove.

We claim:

1. An electrical high voltage apparatus selected from the group consisting of underground cables, undersea cables, high voltage switches, transformers and capacitors, the apparatus having a polymeric dielectric insulation not normally exposed to sunlight, the insulation containing an ultra-violet light stabilizer present in quantity sufficient so as to retard the degradation of said polymeric dielectric insulation resulting from the ultra-violet radiation produced by the electric field carried in the apparatus and thereby extending the time to initiation of electrical treeing in the dielectric insulation.

2. An apparatus as in claim 1 wherein the concentration of oxygen in the polymeric dielectric is reduced from the normal equilibrium amount.

3. An apparatus as in claim 2 wherein at least part of the oxygen is substituted by an inert gas.

4. An apparatus as in claim 3 wherein the inert gas is nitrogen.

5. An apparatus as in claim 1 wherein the polymeric dielectric is chosen from the group comprising: polyolefins, such as low density polyethylene, ethylene-propylene-diene terpolymer, and ethylene propylene rubber; and epoxy resins.

6. An apparatus as in claim 5 wherein the ultraviolet light stabilizer is chosen from the group comprising: benzotriazoles, nickel chelates, hindered amine light stabilizers and substituted benzophenones.

7. An apparatus as in claim 6 wherein the maximum concentration of ultra-violet light stabilizer is the equilibrium concentration.

8. An apparatus as in claim 2 wherein the polymeric dielectric is chosen from the group comprising: polyolefins, such as low density polyethelene, ethylene-propylene-diene terpolymer, and ethylene propylene rubber; and epoxy resins.

9. An apparatus as in claim 8 wherein the ultra-violet light stabilizer is chosen from the group comprising: benzotrizoles, nickel chelates, hindered amine light stabilizers and substituted benzophenones.

10. An apparatus as in claim 9 wherein the maximum concentration of ultra-violet light stabilizer is the equilibrium concentration.

* * * * *

UNITED STATES PATENT AND TRADEMARK OFFICE
CERTIFICATE OF CORRECTION

PATENT NO.  :  4,870,121
DATED       :  September 26, 1989
INVENTOR(S) :  Soli S. Bamji, Aleksander T. Bulinski & John Densley It is certified that error appears in the above-identified patent and that said Letters Patent is hereby corrected as shown below:

Claim 9, l. 63, "benzotrizoles" should be -- benzotriazoles --

Signed and Sealed this

Seventh Day of August, 1990

Attest:

HARRY F. MANBECK, JR.

*Attesting Officer*           *Commissioner of Patents and Trademarks*